United States Patent [19]
Bernardo

[11] Patent Number: 5,114,204
[45] Date of Patent: May 19, 1992

[54] COLLAPSIBLE INTERIOR SUN SHADE FOR UNOCCUPIED MOTOR VEHICLE

[76] Inventor: Alfredo P. Bernardo, 4399 Arrowwood Cir., Concord, Calif. 94521

[21] Appl. No.: 405,943

[22] Filed: Sep. 12, 1989

[51] Int. Cl.$^5$ ............................................. B60J 11/00
[52] U.S. Cl. ..................................... 296/136; 160/327; 297/184; 297/220; 150/154
[58] Field of Search ............ 296/39.1, 39.3, 97.7, 296/136; 160/327, 368.1; 297/184, 220, 224, 226; 150/901; 135/103, DIG. 9

[56] References Cited

U.S. PATENT DOCUMENTS

| | | | |
|---|---|---|---|
| 2,638,378 | 5/1953 | Molinaro | 296/136 |
| 2,991,119 | 7/1961 | Young | 296/97.7 |
| 3,062,381 | 11/1962 | Maiden | 160/327 X |
| 4,262,955 | 4/1981 | Duda | 296/24.1 |
| 4,377,307 | 3/1983 | Santarelli | 296/136 |
| 4,458,738 | 7/1984 | Wilson | 296/39.1 X |
| 4,590,956 | 5/1986 | Griesenbeck | 135/104 X |
| 4,635,993 | 1/1987 | Hooper et al. | 296/95.1 |
| 4,659,144 | 4/1987 | Reese | 296/39.1 |
| 4,684,165 | 8/1987 | Becker | 296/136 |
| 4,699,192 | 10/1987 | Kamen et al. | 296/136 X |
| 4,708,388 | 11/1987 | Zacharczuk | 296/97.7 |
| 4,749,222 | 6/1988 | Idland | 160/DIG. 2 |
| 4,758,041 | 7/1988 | Labeur | 160/274 X |
| 4,758,042 | 7/1988 | Liu | 160/84.1 X |
| 4,762,358 | 8/1988 | Levosky et al. | 160/274 X |
| 4,784,426 | 11/1988 | Mannisto-Iches | 296/97.7 |
| 4,790,340 | 12/1988 | Mahoney | 135/104 X |
| 4,828,319 | 5/1989 | Benson | 296/136 |
| 4,893,668 | 1/1990 | Nomura | 160/368.1 X |
| 4,945,584 | 8/1990 | LaMantia | 135/104 X |

FOREIGN PATENT DOCUMENTS

1654289 3/1971 Fed. Rep. of Germany ...... 297/220
2049571 12/1980 United Kingdom ............... 296/136

Primary Examiner—Dennis H. Pedder

[57] ABSTRACT

A sunshade is deployed horizontally across the vehicle's interior and covers the top of the dashboard, front and rear seats, and the space, or a portion thereof, between the upper edge of the back of the rear seat and the rear window of the vehicle. In the preferred embodiment, the sunshade comprises a flexible cover supported in place by one elongated arm in the front portion and two foldable elongated arms in the rear portion. The flexible material includes an adjustable envelope-style cover for the car seat headrests and an appropriately elevated portion which accommodates the steering wheel. The remaining portion of the flexible material is generally flat.

2 Claims, 11 Drawing Sheets

COLLAPSIBLE INTERIOR SUN SHADE FOR UNOCCUPIED MOTOR VEHICLE

BACKGROUND

1. Field of Invention

This invention relates to sun shades for unoccupied motor vehicles, particularly to a collapsible sun shade deployed horizontally across the vehicle's interior.

2. Description of Prior Art

Exposure to sunlight is a major cause of deterioration of various parts of a vehicle's interior. Particularly susceptible to discoloration, deformation, and cracking are those parts which are made of plastic, vinyl, leather or cloth, such as the dashboard and seats. Expensive equipment such as stero speakers and telephone also need protection from the harmful effects of direct sunlight. In addition, continuous exposure to sunlight results in the steering wheel, gear shift handle, seats, and other interior parts becoming excessively warm to human contact, causing discomfort if not harm, to the driver and passengers.

Prior-art devices for shielding the vehicle's interior from the sun involve covering either the windshield, side windows, rear window, or dashboard by deploying individual devices inside the vehicle. Exemplary prior art devices are shown in U.S. Pat. No. 4,708,388 to Zacharczuk (1987), U.S. Pat. No. 4,762,358 to Levosky et al. (1988), U.S. Pat. No. 4,758,041 to Labeur (1988), U.S. Pat. No. 4,758,042 to Liu (1988), U.S. Pat. No. 4,749,222 to Idland (1988), and U.S. Pat. No. 2,991,119 to Young (1961). These devices leave certain portions of the vehicle's interior unprotected from sunlight. The portions which are unprotected depend upon the sun's angle which changes during the day. Although the entire interior could be protected using these devices by covering all the vehicle windows and the windshield, this requires the cumbersome task of deploying several individual units in different locations inside the vehicle.

Most external covers protect the entire vehicle's interior from direct sunlight by covering all the windows and the windshield. Typical of covers are shown in U.S. Pat. No. 4,684,165 to Becker (1987), U.S. Pat. No. 4,699,192 to Kamen et al. (1987), and U.S. Pat. No. 4,635,993 to Hooper et al. (1987). However, the primary purpose of these external covers is to protect the external finish of the vehicle. They compete with more popular and effective modern products, such as car waxes and sealants. These waxes and sealants offer the additional advantages of making the vehicle's finish shiny and more attractive, and protecting the vehicle's finish even during driving, which is when most of the dirt and other harmful natural elements are accumulated. External covers are also easily susceptible to theft and vandalism, and are cumbersome to install and store. They also hide signs of break-ins, such as shattered glass windows or damaged locks, thereby prolonging discovering thereof. In addition, since most external covers blanket the entire body of the vehicle, they are considered excessive and wasteful by those consumers who only want protection for the vehicle's interior. Due to these shortcomings, external covers are either not used regularly or not used at all.

The lower portion of the vehicle's interior located between the floor and the lower edge of the windshield, side windows, and the rear window, contains the interior parts, such as the dashboard, steering wheel, seats, and stereo equipment, which are susceptible to sunlight damage. This is also the portion of the interior with which the driver and passengers normally come in direct contact when the vehicle is occupied. Therefore, if this portion becomes excessively warm to human contact, it could cause discomfort, if not harm, to the driver and passengers. In addition, because this portion of the interior is bordered on the sides by the instrument panel, vehicle doors, and rear seats, it has considerably more insulation from the sun and external temperature than the upper interior portion, which, in comparison, is bordered by the windshield, glass windows, and the roof.

OBJECTS AND ADVANTAGES

Considering these factors, a general object and purpose of the invention is to provide protection from the harmful effects of direct sunlight to the aforementioned lower portion of the interior and its contents, in a continuous and consistent manner regardless of the sun's position. Another object is to prevent excessively warm temperatures originating at the less-insulated upper portion of the interior from directly going to the more-insulated lower portion of the interior.

Further objects of the invention are to provide a sunshield that conveniently folds for easy installation and storage, and to provide a sunshield that is less susceptible to theft and vandalism.

In addition, the following are additional advantages of the invention: it discourages theft of expensive equipment and valuables left inside the vehicle by concealing them from public sight; it protects the interior equipment and accessories from dust and other dirt when the vehicle's windows are left partially open for ventilation; and it provides cover for the door lock plungers or latches, thereby preventing them from being hooked open by unauthorized persons through the gap of windows left partially open for ventilation.

These and other objects and advantages of the invention will become apparent from the following detailed description of the preferred embodiments and the accompanying drawings.

DRAWING REFERENCE NUMERALS

20—flexible cover
21—support frame
22—front support arm of 21
23—rear support arm of 21
24—steering wheel hood of 20
26—height adjuster belt
28—headrest hood of 20
30—elbow of 23
32—opening of 20
34—frame pouch
36—stationary member of 23
38—movable member of 23
40—rivet
42—frame roof
44—connector arm
46—latch bolt
48—frame end pocket
50—fixed tubular member of 23
52—removable tubular member of 23
54—stretchable cord
56—ferrule
58—knot of 54
60—accommodating arm of 23
62—"T" cavity of 60
64—sliding arm of 23
66—"T" portion of 66
68—stem of 66
70—support leg
72—connecting arm
74—reflector material
76—hook
78—suction cup
80—punch holes
82—rigid cover material
84—fold crease
86—car windshield
88—car seat
90—car side window
92—car back window

DETAILED DESCRIPTION OF THE INVENTION

FIGS. 1–6

Figure 1:
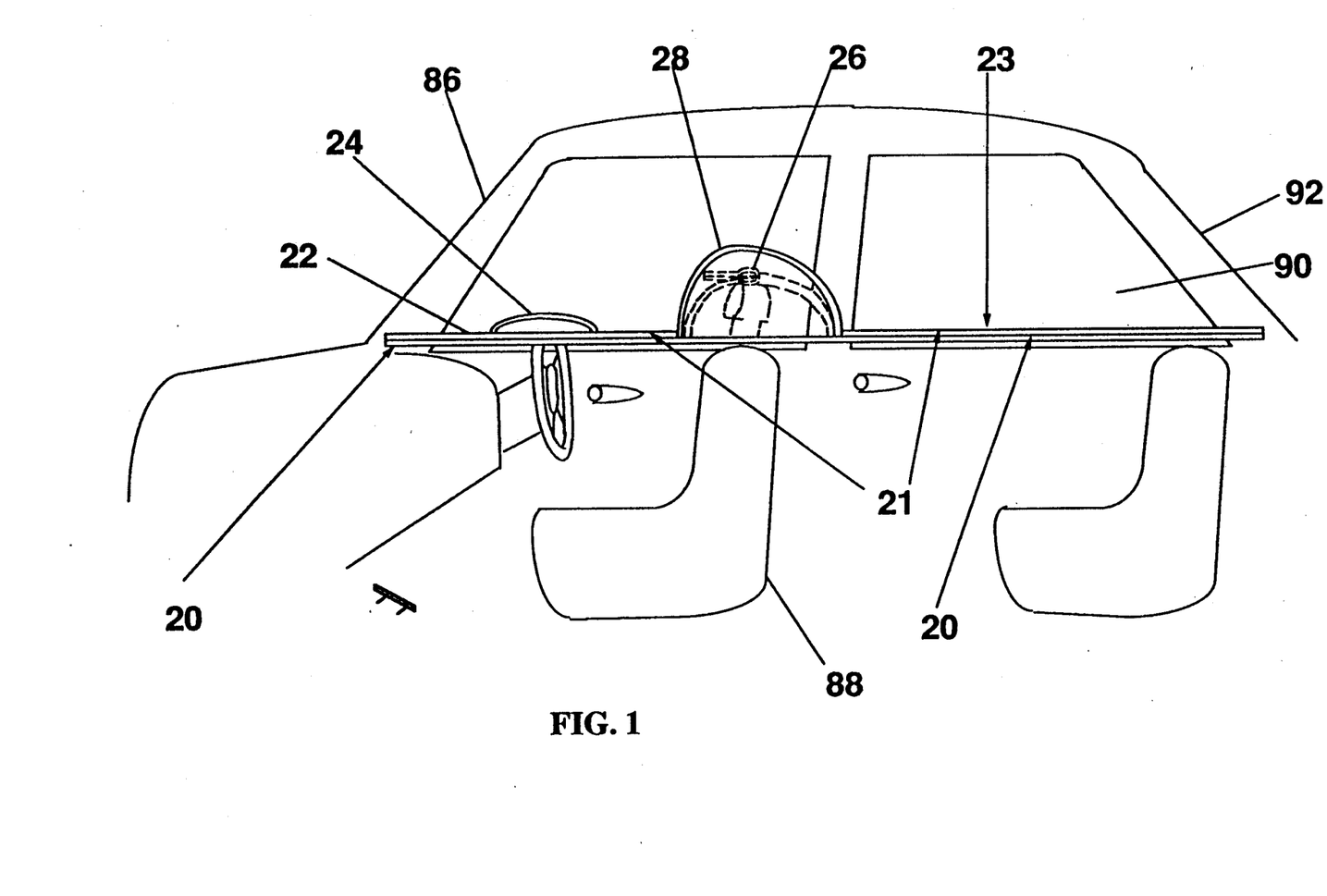
FIG. 1 shows a fragmentary side view of a vehicle embodying the current invention.
Figure 2:
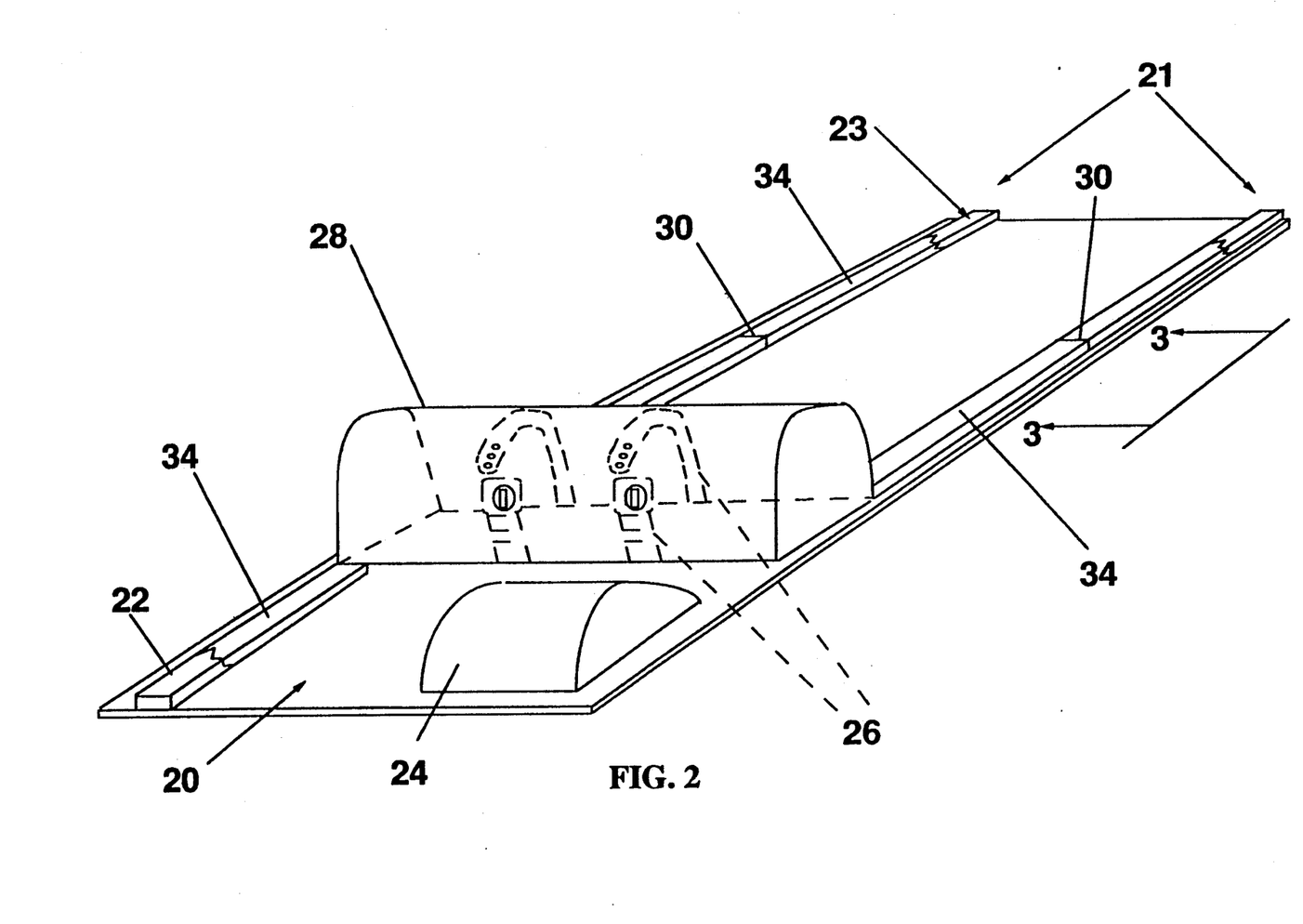
FIG. 2 shows a perspective elevational view of the sun shade according to the preferred embodiment of the invention.
Figure 3:
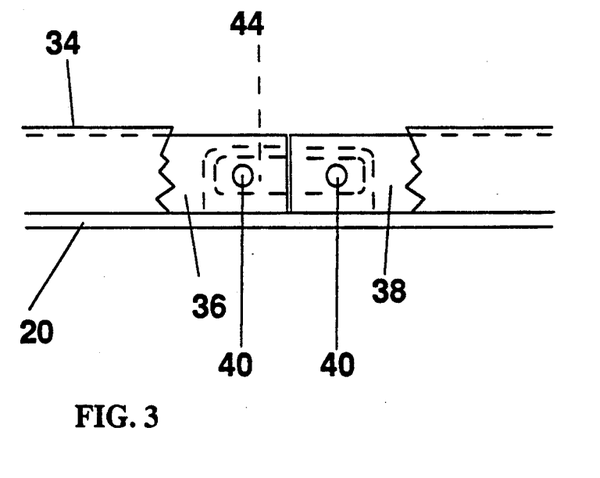
FIG. 3 shows a side-sectional view of the elbow on the frame taken along the line 3—3 of FIG. 2.

As shown in FIGS. 1 and 2, the preferred embodiment of a sunshade for a vehicle's interior according to my invention generally comprises a flexible cover 20 and a support frame 21 to hold cover 20 snug and taut in place. Cover 20 is generally flat in shape, with the exception of a steering wheel hood 24 and a seat headrest hood 28. Steering wheel hood 24 comprises a slightly raised portion of the cover material to accommodate the part of the steering wheel that is elevated above the dashboard. Headrest hood 28 is an envelope-style cover surrounding the top and sides of the headrest, and extending downwards to generally cover any portion of the seat backrest that is above the lower edge of the side windows on each side of the vehicle.

The headrest hood is large enough to prevent or minimize displacement of the sunshade if the front seats are adjusted to the extreme forward or backward position. Also, it extends continuously across the entire sunshade. Alternatively, it can be separated into two identical envelope-style covers, each one covering the individual headrest of bucket-type front seats. For car models which have headrests in the back seats, a headrest hood can be similarly provided for the back seats.

As further shown in FIG. 2, a view of the sunshade per se, underneath headrest hood 28 and attached thereto is a belt 26. As shown in FIG. 1, this belt is deployed on top of the headrest for adjusting the height of the sunshade, depending upon the length of the headrest. The purpose and usefulness of the belt is explained below.

Steering wheel hood 24, headrest hood 28, and belt 26 are joined to the flat portion of cover 20 by sewing, gluing, or utilizing other adhesive means suitable to the type of flexible cover material used. The cover material can be made from canvas, nylon, rayon or other materials which are generally ultraviolet resistant and which provide insulation from warm temperature. The belt can be made from the same materials, or from leather or flexible plastic.

Figure 4:
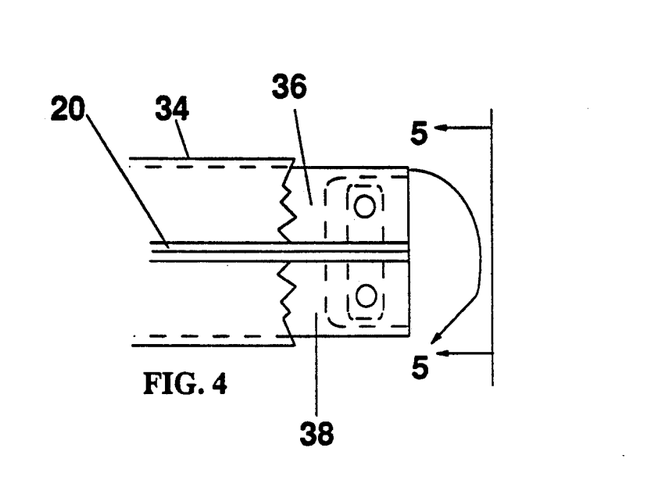
FIG. 4 shows a side-sectional view of the elbow shown in FIG. 3 in a folded position.
Figure 5:
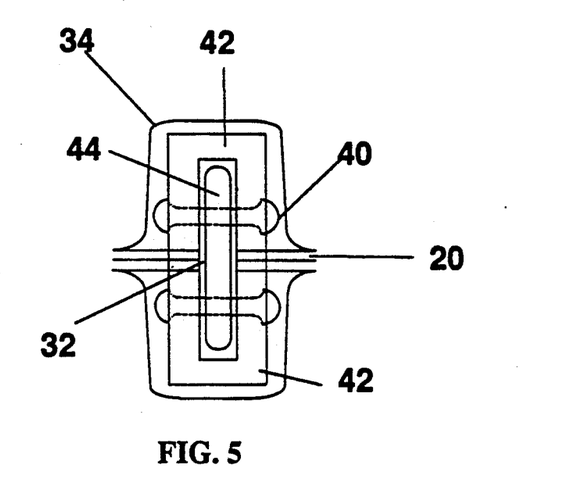
FIG. 5 shows a rear sectional view of the elbow on the frame in a folded position along the line 5—5 of FIG. 4.

Support frame 21 comprises elongated arms at strategic portions on the top side of the cover to keep it taut and snug in place. In the preferred embodiment, illustrated in FIG. 2, the support frame comprises one elongated arm 22 at the right edge of the front flat portion and two arms 23 at the left and right edges, respectively, of the rear flat portion of the cover. These arms are adequately close to the sides of the front and rear flat portions of the cover to prevent it from drooping. Arms 23 at the rear portion are foldable in a clockwise direction at elbow or hinge 30 to allow installation and convenient storage of the sunshade. As illustrated by the side view of the elbow in FIG. 3, foldable arm 23 comprises a stationary member 36 and a movable member 38 joined together at their ends by a connector arm 44 loosely attached to these members by rivets 40 or other similar fastening means. In a folded position, the flexible material is between the stationary and movable members of the foldable arm, as shown in FIG. 4. As shown in FIG. 5, connector arm 44 is accommodated inside an inverted "U" shaped portion at the end of the stationary and movable members of the foldable arm. A roof 42 on the inverted "U" shaped portion prevents the foldable arm from folding in a counter-clockwise direction. FIG. 5 also shows that cover 20 has an opening 32 approximately the length and thickness of connector arm 44 to allow the arm to move in a clockwise direction when the sunshade is folded.

Figure 6:
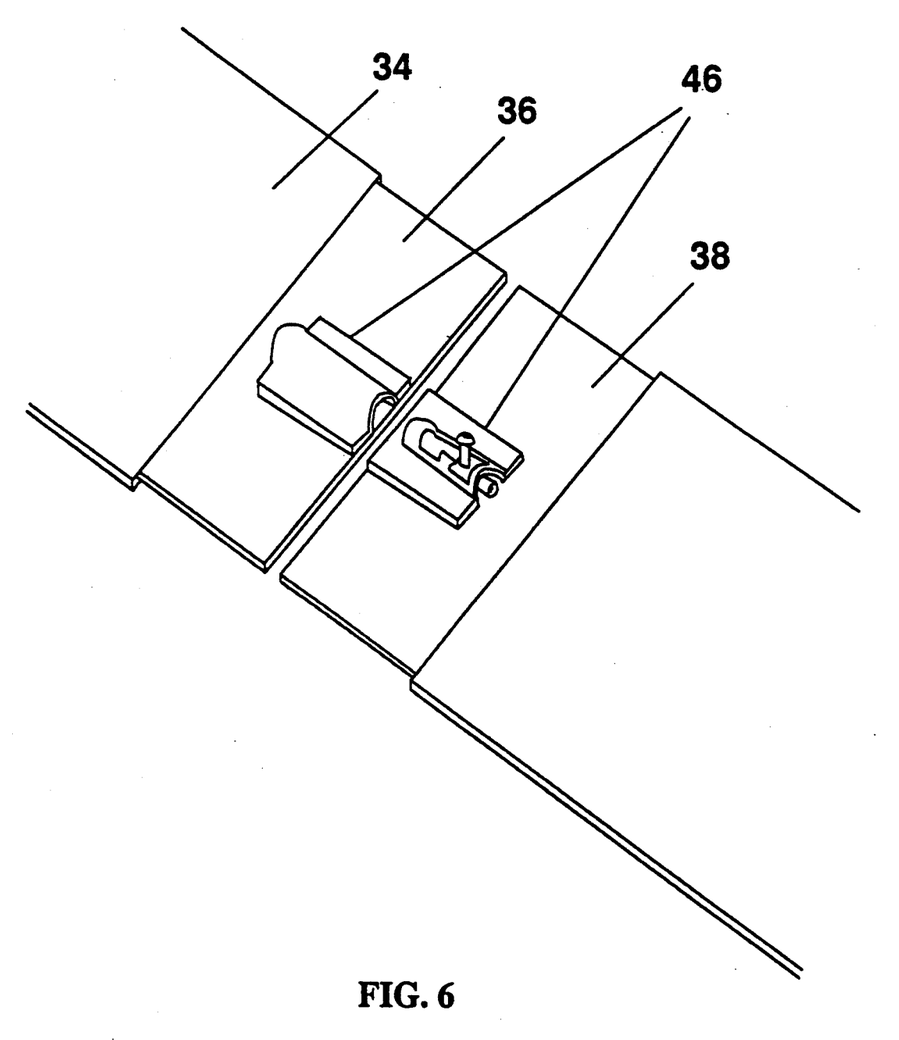
FIG. 6 shows a perspective elevational view of the elbow using an alternative folding means.

As further shown in FIGS. 2 and 6, a frame pouch 34 encloses and affixes support arms 22 and 23 to cover 20. The frame pouch enclosing foldable arm 23 is separated near elbow 30 (FIG. 6) to allow bending of the arm at the intended portion. The frame pouch is attached to the cover material by sewing, gluing, or other similar means. The support arms can be made from plastic, lightweight metal, firm rubber, or other similar materials. Alternatively, arm 22 at the front portion of the sunshade may be foldable, or arms 23 at the back portion may be foldable at more than one point, depending upon their lengths.

FIG. 1 illustrates the deployed position of the sunshade within the vehicle's interior. The sunshade is installed by placing front arm 22 on the dashboard, placing steering wheel hood 24 over the steering wheel, hanging headrest hood 28 with belt 26 on top of the headrest, and placing rear arms 23 on top of the upper edge of the rear seat. When installed, the sunshade covers the entire portion of the vehicle's interior that is below the lower edge of windshield 86, side windows 90, and rear window 92. As a result, the sunshade shades this portion of the vehicle's interior, regardless of the sun's position in relation to the vehicle. When used with heat insulation material, it also serves as an effective shield to prevent the warm temperature at the upper portion of the vehicle's interior from going directly to the shaded lower portion.

It is obvious from the foregoing discussion that in order for the middle portion of the sunshade to be situated approximately at the lower edge of the side windows, the length of headrest hood 28 should be approximately the same as the length of the portion of the seat backrest and headrest that is above the window's edge. However, the headrests in most car models can be raised or lowered, in effect, varying their lengths. To account for this variation, headrest hood 28 includes belt 26, or other similar adjusting means, that is deployed on top of the headrest and can be lengthened or shortened as the headrests are adjusted up or down, respectively.

The top of the dashboard and rear seats in some car models are significantly above the lower edges of the side windows. As a result, when the sunshade is placed on top of them, a considerable amount of sunlight and heat can penetrate directly through the glass portion to the lower portion of the vehicle's interior. In these case, the dimension of the cover can be extended on the sides in the form of an awning or other similar means to cover any significant gap between the lower edge of the windows and the upper edge of the dashboard or rear seats.

Several other means are available which can be appropriately employed to enable support arms 23 to fold in a clockwise direction. An example of such variation is the use of a latch bolt lock, as illustrated in FIG. 6. In this variation, when the sunshade is in a deployed position, elbow 30 is manually locked by extending bolt 46 across the adjacent ends of the stationary and movable members of the folding arm. The latch bolt is manually unlocked to allow folding of the sunshade. Other folding means can also be employed.

In addition, depending on the relative stiffness of the cover material used, additional support arms can be included to keep the material snugly in place. For example, instead of one support arm, two arms can be placed on the front portion of the sunshade. Alternatively, the sunshade can include an additional arm across the sunshade and connecting the arms on the opposite sides of the cover at the ends of the arms, or any strategic point thereof, to provide the desired support.

Experimentation has shown that when the current device provides such shade and additional insulation to the lower portion, this portion remains at a considerably lower temperature than the upper portion, and the overall temperature inside the vehicle drops at a faster rate when the vehicle is subsequently opened and ventilated. I attribute the latter to the fact that the interior cover absorbs the heat and is removed from the interior when the vehicle is occupied. Without the use of the cover, any interior portions which become warm from sun exposure remain inside, therefore prolonging or not alleviating the warm temperature inside the vehicle.

Figure 7:
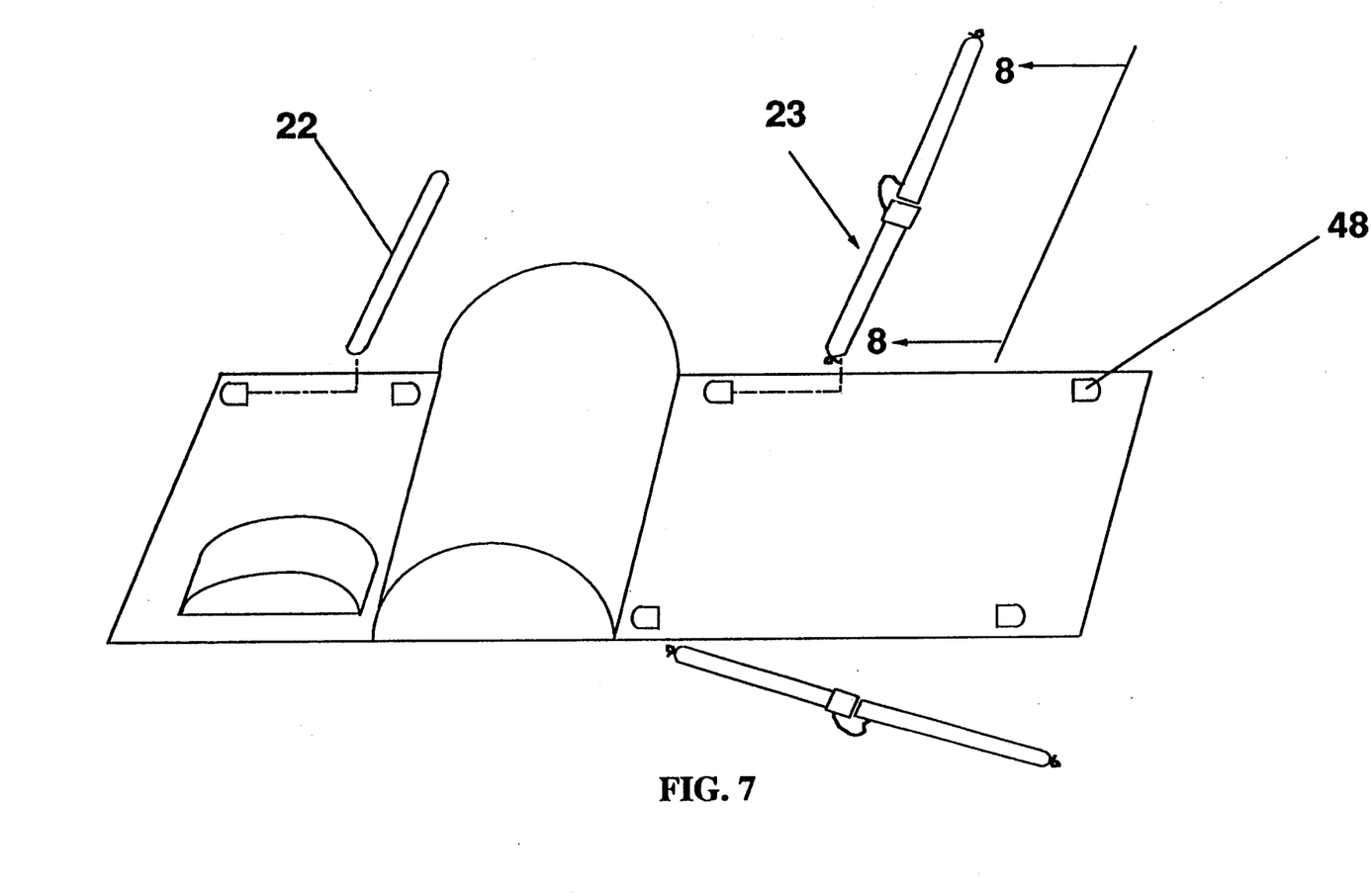
FIG. 7 shows a perspective elevational view of a sunshade according to an alternative embodiment of the invention.
Figure 8:
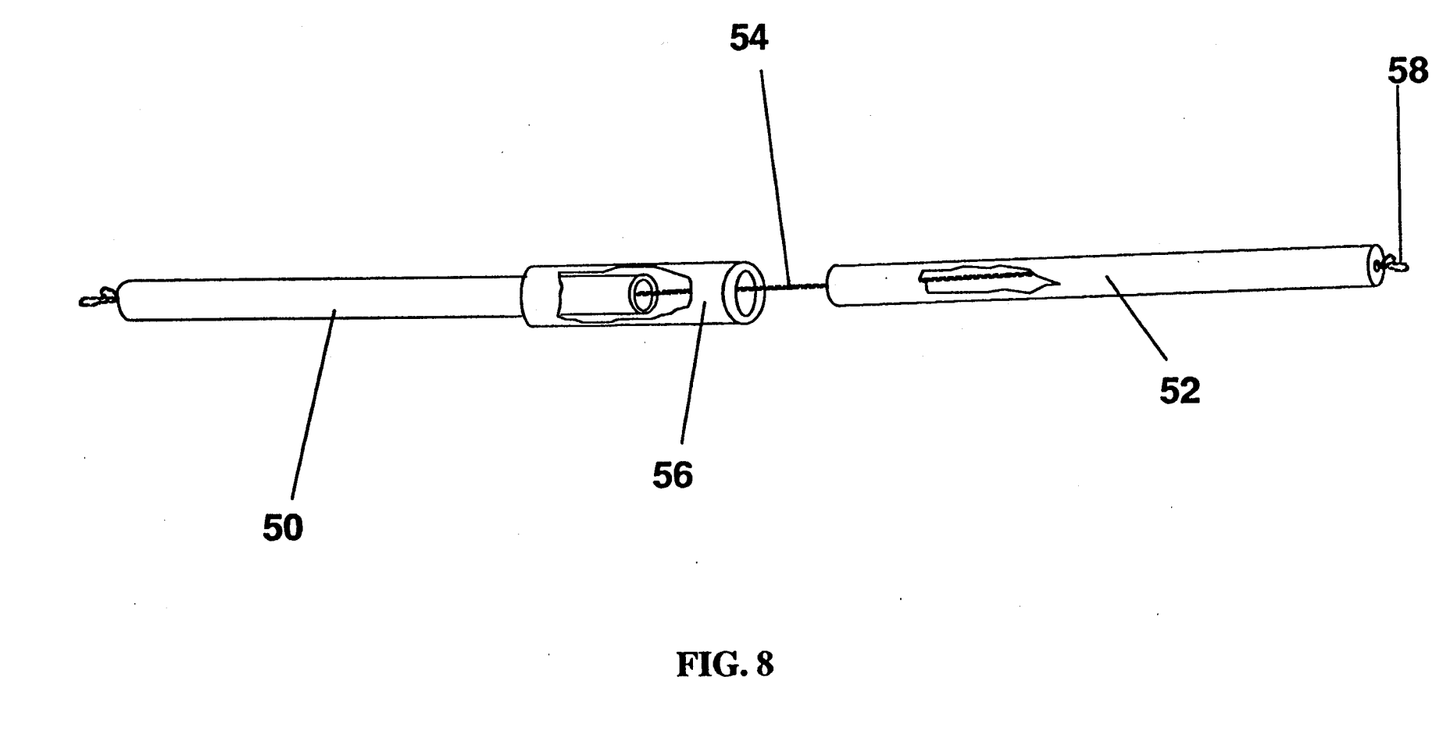
FIG. 8 shows a detailed perspective side view of the frame arm taken along the line 8—8 of FIG. 7.

FIGS. 7-8—Detachable Arms

In an alternative embodiment, illustrated in FIG. 7, elongated arms 22 and 23 are detachable from the cover. Each of the arms is installed, whenever the sunshade is used, by inserting both ends of each arm inside small end pockets 48 located at strategic points on the top side of the material, so that the cover is held taut and snugly in place. The end pockets are attached to the cover material by gluing, sewing, or other suitable means. As illustrated in FIG. 8, the foldable arms are composed of two elongated tubular members 50 and 52, joined together by a ferrule 56. Member 50 is affixed permanently to the ferrule. Member 52 is releasably received by the ferrule, so that the arm can be folded and conveniently stored. The two matching tubular members of the foldable arm are joined together by a stretchable cord 54 to facilitate associating one member with the other during installation. The cord are inserted inside the tubular members and held by a knot 58 at the ends. The arms of the support frame may have other than a tubular configuration and can have a semi-circular or even a generally rectangular cross-sectional configuration. Other foldable means, such as the one discussed in the preferred embodiment, can be used. It is only necessary for the purpose of this embodiment that the arms be detachable from the cover material.

Figure 9:
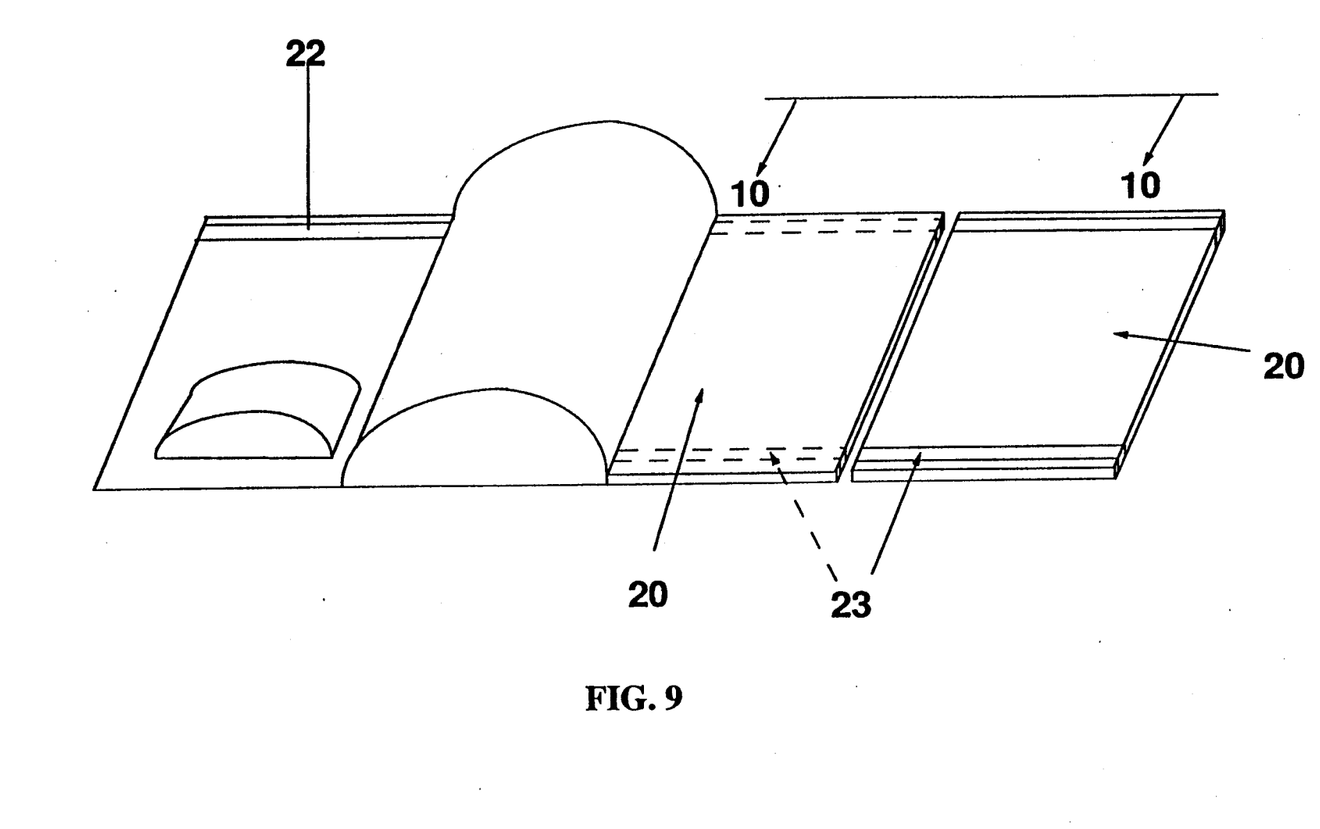
FIG. 9 shows a perspective elevational view of a sunshade according to yet another alternative embodiment of the invention.
Figure 10:
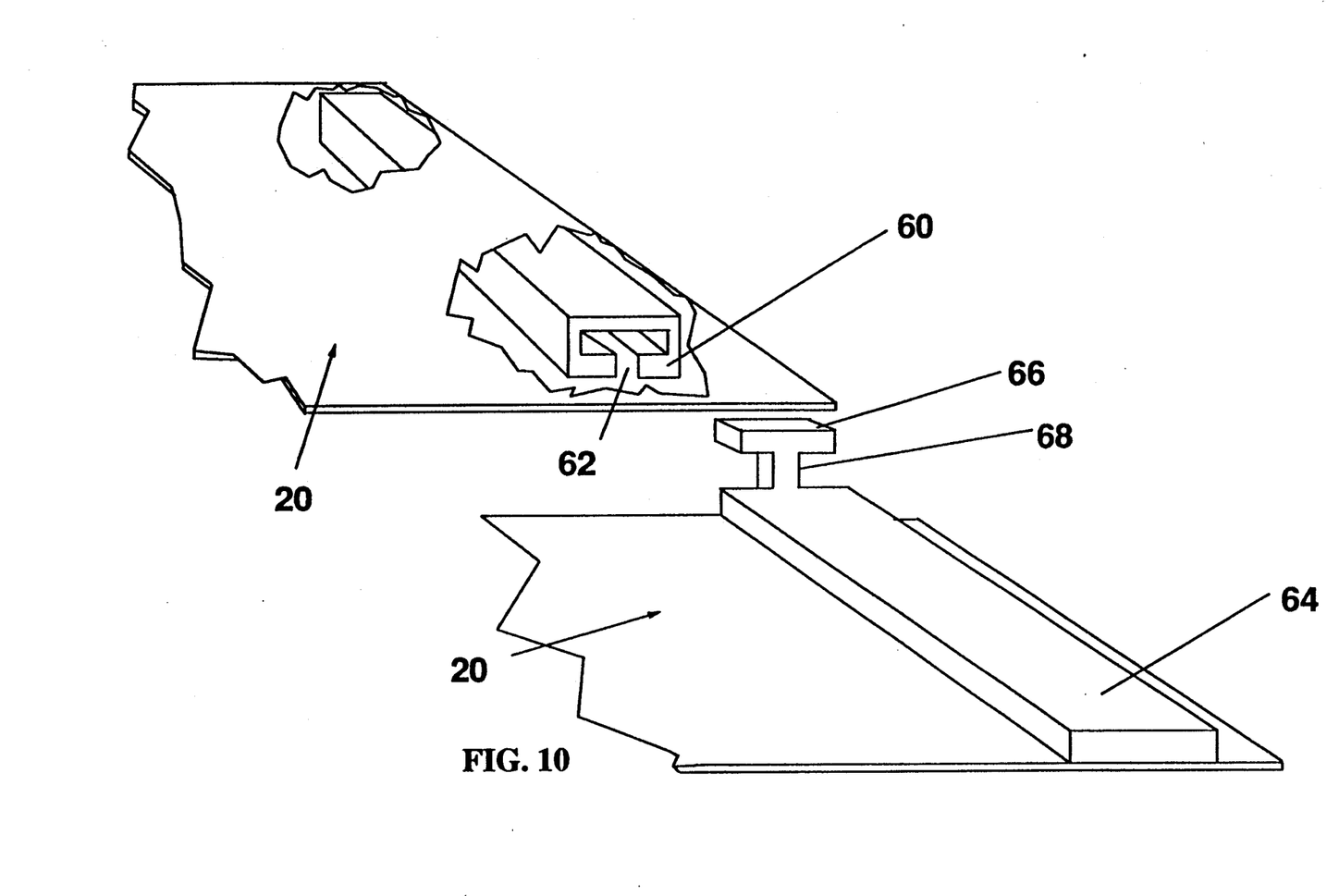
FIG. 10 shows a side-sectional view of the fixed and sliding arms along the line 10—10 of FIG. 9.

FIGS. 9-10—Sliding Arms

FIG. 9 illustrates yet another alternative embodiment. This embodiment is the same as the preferred embodiment, except that the arms at the rear portion of the sunshade use sliding means, instead of foldable means, to protract and retract the sunshade for installation and storage, respectively. As shown in FIG. 10, the rear arm comprises an accommodating member 60 and a sliding member 64. The sliding member includes a vertical standing "T" portion 66 on top of one end. The accommodating member has a "T" shaped cavity 62 underneath. The cavity is closed at both ends and is of such dimension as to accommodate "T" portion 66 of the sliding member and allow the latter to slide the entire length of said accommodating member. Cover 20 is attached to sliding member 64 and is detached from the rest of the flexible material. This allows the rear portion of the sunshade to slide underneath the flexible material covering accommodating members 60 of the rear arms.

Cover 20 is attached on top of accommodating members 60 and underneath sliding members 64 of the rear arms of the frame. Alternatively, the cover can be affixed to the sliding members and can also be on top of such members. This is done by providing an opening on the flexible material for stem 68 of the "T" portion 66 of the sliding arms. Another possible variation of this embodiment is the use of small wheels in lieu of the "T" portion of the sliding member. These wheels fit inside the cavity of the accommodating member of the rear arm.

Figure 11:
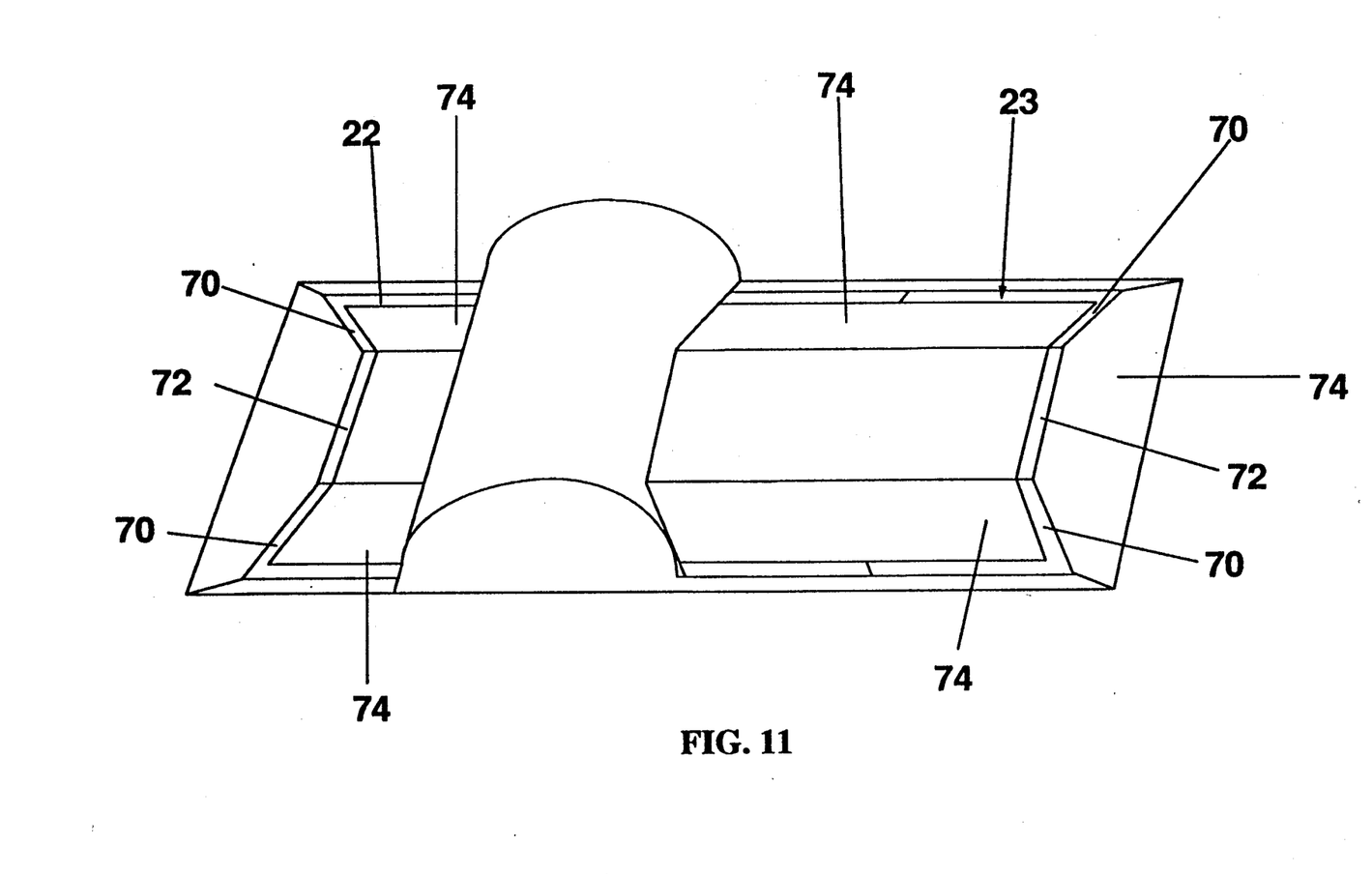
FIG. 11 shows a detailed perspective elevational view of a sunshade according to yet another alternative embodiment of the invention.

FIG. 11—Elevated Inner Portion

FIG. 11 illustrates yet another alternative embodiment of the invention. In this embodiment, the flat portion of the flexible material described in the preferred embodiment is instead elevated at a desired angle from the sides, front, and rear towards the inner portion of the sunshade, for the purpose of reflecting the sunlight back towards the glass portion of the vehicle. Support legs 70 are affixed in an angled upright position to arms 22 and 23 on the sides of the sunshade, thereby raising the inner portion of the sunshade to the desired elevation angle. Legs 70 on opposite sides of the sunshade are joined together by a connecting arm 72 to reinforce the legs and prevent the inner flat portion of the flexible material from sagging. The elevation of the flexible material in the front portion of the sunshade is high enough to cover the steering wheel. To more effectively reflect the sunlight towards the glass portion and outside of the vehicle, reflector material 74 can be used for the slanting portions and other appropriately designated portions of the sunshade. The foldable or sliding means earlier described can be employed appropriately in this embodiment to facilitate storage and installation of the sunshade.

Figure 12:
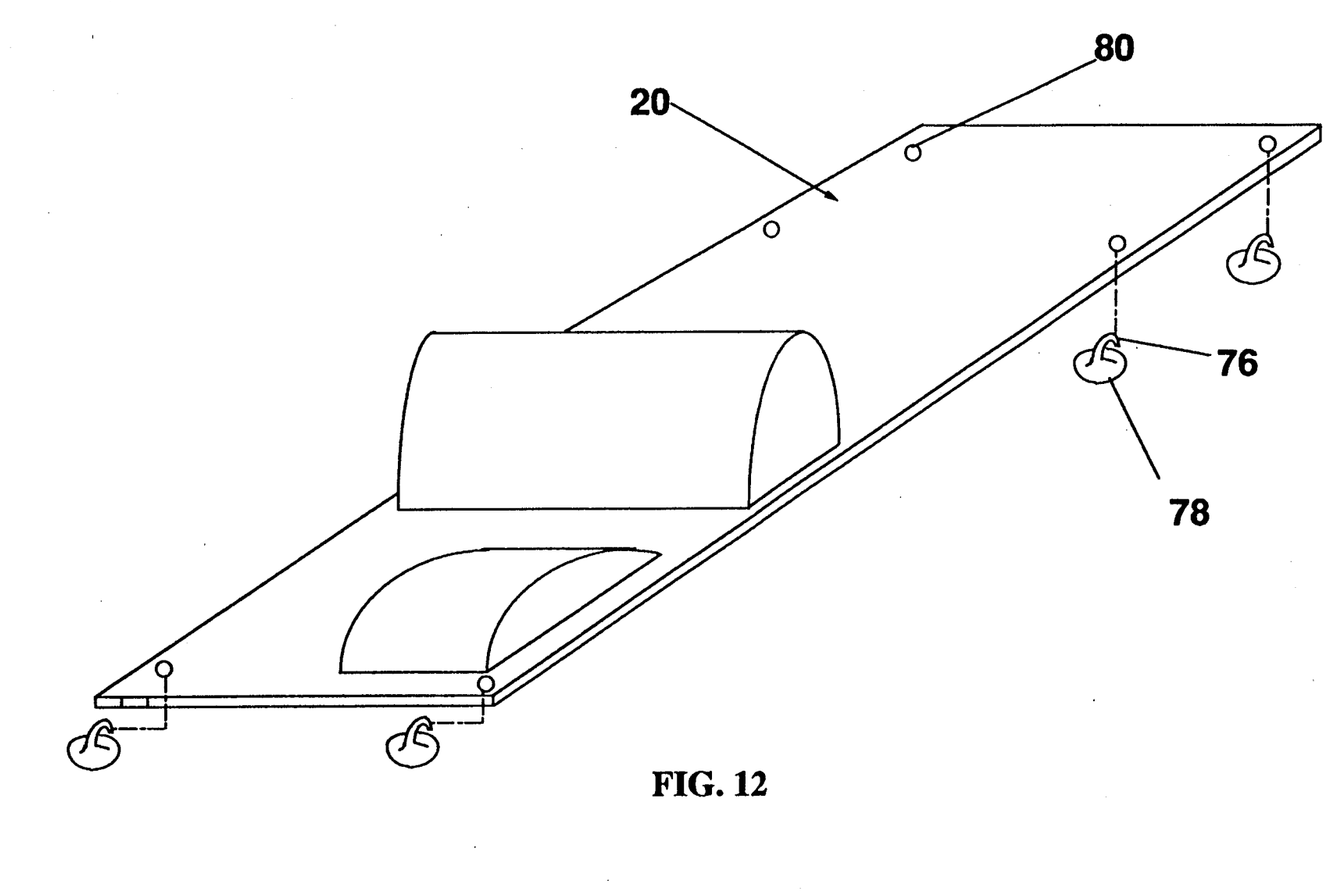
FIG. 12 shows a perspective elevational view of a sunshade according to yet another alternative embodiment of the invention.

FIG. 12—Hanging Means in Lieu of Arms

In yet another alternative embodiment, illustrated in FIG. 12, suction cups 78 with a hook 76 connected thereto are releasably attached at strategic places inside the vehicle. Instead of using a support frame structure, cover 20 is held taut and snugly in place by inserting these hooks through holes 80 on the cover. Other variations of this embodiment can be in the form of hooks or other similar means which are permanently attached to the vehicle interior body or other vehicle parts. In addition, instead of holes on the cover material, other means, such as hook-and-loop fasteners, loop string, or like items attached to the cover material can be employed in coupling the cover material with the aforementioned hooks or other similar gadgets that are attached temporarily or permanently to the vehicle's interior.

Figure 13:
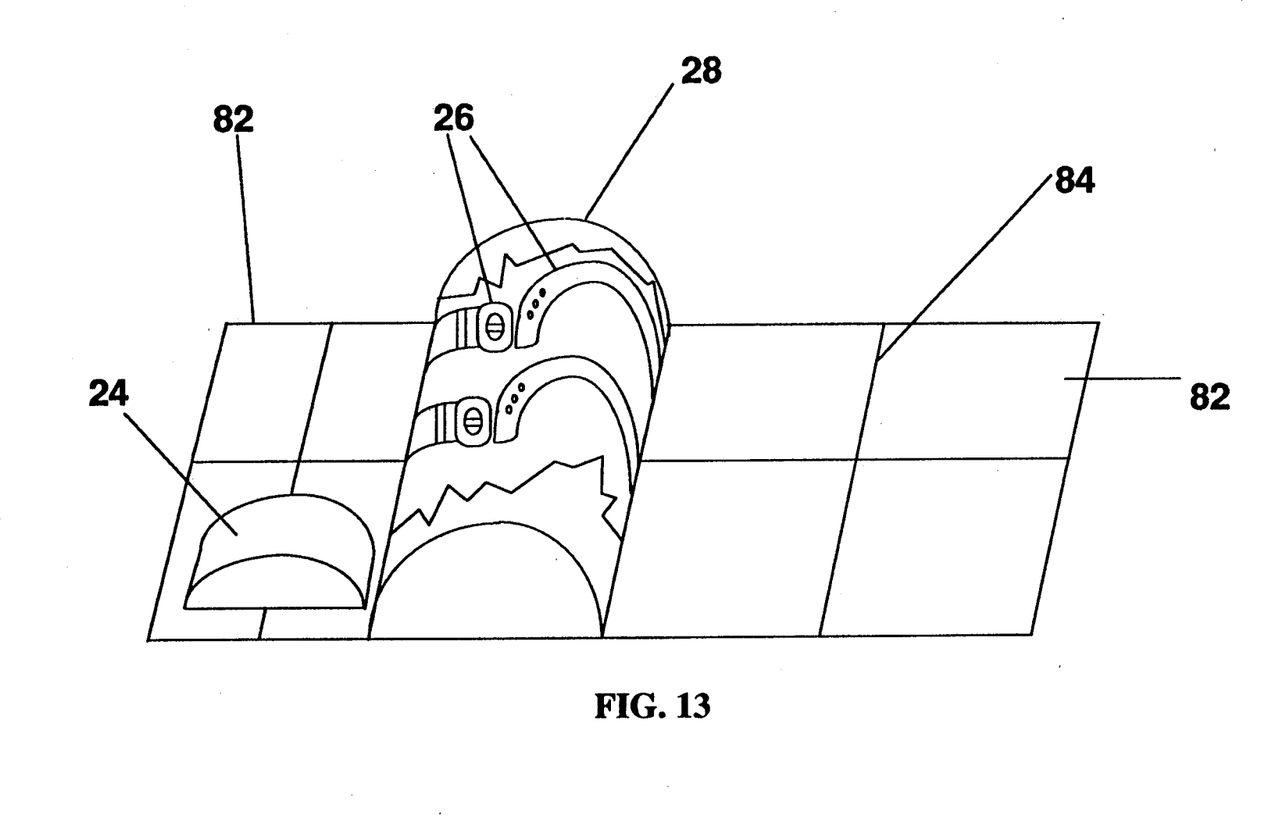
FIG. 13 shows a detailed perspective elevational view of a sunshade according to yet another alternative embodiment of the invention.

FIG. 13—Foldable Rigid Cover Without Arms

In yet another embodiment, illustrated in FIG. 13, steering wheel cover 24, seat headrest hood 28, and belt 26 are made from flexible material, as discussed in previous embodiments. However, the rest of the cover is made from a rigid material 82, such as cardboard or one of the rigid polymers of sufficient stiffness to stay snug and taut by itself when the sunshade is deployed. This material is foldable at fold lines 84 to facilitate storage. The steering wheel cover, headrest hood, and belt are attached to the rigid material by gluing, sewing, and other appropriate means.

SCOPE

While the above description contains many specificities, these should not be construed as limitations on the scope of the invention, but rather as exemplification of some preferred embodiments thereof. Many other variations are possible. Accordingly, the scope of the invention should be determined, not by the embodiments illustrated, but by the appended claims and their legal equivalents.

I claim:

1. A collapsible sunshade cover for the interior of an unoccupied motor vehicle, which interior has a front, a rear, and opposite sides, a dashboard across the front of said interior, a steering wheel to the rear of said dashboard, at least one seat having an upright back to the rear of said steering wheel, said seat having an upper edge, a rear window to the rear of said seat, and at least one side window on each opposite side of said interior, said sunshade cover comprising:

a sheet of flexible material of sufficient size to cover horizontally said interior from said dashboard to under said rear window, and from one side of said interior to the other side, said sheet being arranged to extend over said steering wheel and said back of said seat, support means for keeping said sheet of flexible material taut and snug in place, said support means comprising a plurality of rigid arms on opposite side edges of said flexible sheet, said arms including means for collapsing said arms so that said cover can be stored in a more compact arrangement, and means for affixing said edges of said flexible sheet to said arms, said plurality of rigid arms being positioned on said dashboard and at a plurality of positions on said upper edge of said seat, said rigid arms each comprising a fixed portion and slidable portion, said means for collapsing said arms so that said cover can be stored in a more compact arrangement including sliding means for extending and retracting said slidable portion of each arm in a generally horizontal plane for allowing easy installation and storage of said sunshade, said sheet of flexible material comprising two portions, one affixed to said slidable portion of each arm and another affixed to said fixed portion of each arm.

2. A collapsible sunshade cover for the interior of an unoccupied motor vehicle of the type which has an interior which in turn has a front, a rear, and opposite sides, a dashboard across the front of said interior, a steering wheel to the rear of said dashboard, at least one seat having an upright back to the rear of said steering wheel, a rear window to the rear of said seat, and at least one side window on each opposite side of said interior, said sunshade cover comprising:

a sheet of flexible material of sufficient size to cover horizontally said interior from said dashboard to under said rear window, and from one side of said interior to the other side, said sheet being arranged to extend over said steering wheel and said back of said seat, support means for keeping said sheet of flexible material taut and snug in place, said support means comprising a plurality of hanging means that are releasably attached at spaced locations to said vehicle's interior and corresponding locations around said entire sheet of flexible material, said hanging means comprising a plurality of holes on said sheet and a plurality of respective hooks attached to said vehicle's interior, said sheet of flexible material including a seat headrest cover hood having dimensions sufficient to surround the top and sides of a headrest of a predetermined size which extends up from said back of said seat, said headrest cover hood also extending downward to generally cover any portion of said headrest and said back of said seat that is above the lower edges of said side windows of said vehicle's interior, said seat headrest cover hood having at least one belt thereunder for adjusting said headrest cover hood to the height of said headrest.

* * * * *